(12) United States Patent
Graßl

(10) Patent No.: US 10,951,060 B2
(45) Date of Patent: Mar. 16, 2021

(54) ENERGY SUPPLY DEVICE TO SUPPLY ELECTRICAL ENERGY FOR AT LEAST ONE TERMINAL DEVICE AND METHOD FOR OPERATING AN ENERGY SUPPLY DEVICE

(71) Applicant: AUDI AG, Ingolstadt (DE)

(72) Inventor: Tobias Graßl, Denkendorf (DE)

(73) Assignee: AUDI AG, Ingolstadt (DE)

( * ) Notice: Subject to any disclaimer, the term of this patent is extended or adjusted under 35 U.S.C. 154(b) by 93 days.

(21) Appl. No.: 16/037,191

(22) Filed: Jul. 17, 2018

(65) Prior Publication Data

US 2019/0105996 A1 Apr. 11, 2019

(30) Foreign Application Priority Data

Oct. 11, 2017 (DE) .......................... 102017218165.6

(51) Int. Cl.
*H02J 50/10* (2016.01)
*H02J 7/02* (2016.01)
(Continued)

(52) U.S. Cl.
CPC .............. *H02J 50/10* (2016.02); *B60L 53/00* (2019.02); *B60L 53/12* (2019.02); *B60L 53/14* (2019.02); *B60L 53/22* (2019.02); *B60L 53/30* (2019.02); *H02J 7/0027* (2013.01); *H02J 7/0042* (2013.01); *H02J 7/02* (2013.01); *H02J 7/025* (2013.01); *B60L 2210/30* (2013.01); *B60L 2210/40* (2013.01); *H02J 7/0013* (2013.01)

(58) Field of Classification Search
CPC .... H02J 7/025; H02J 7/02; H02J 5/005; H02J 50/12; H02J 50/10; H02J 50/20
USPC ..... 307/10.1, 9.1, 66, 64, 11, 43, 23, 18, 29, 307/24, 31
See application file for complete search history.

(56) References Cited

U.S. PATENT DOCUMENTS 9,878,628 B2 * 1/2018 Tsukamoto ............. H02J 50/10
2004/0189251 A1 9/2004 Kutkut et al.
(Continued)

FOREIGN PATENT DOCUMENTS

DE 10 2009 020 504 A1 12/2010
DE 102010022727 A1 11/2011
(Continued)

OTHER PUBLICATIONS

Examination Report dated May 18, 2018 of corresponding German Application No. 102017218165.6; 10 pgs.
(Continued)

*Primary Examiner* — Nguyen Tran
*Assistant Examiner* — Jagdeep S Dhillon
(74) *Attorney, Agent, or Firm* — Maier & Maier, PLLC

(57) ABSTRACT

An energy supply device to supply electrical energy for a motor vehicle, having a power grid connector for connection of the energy supply device to an alternating current power grid, having at least one first connecting device for producing a cabled electrical connection between the power grid connector and the motor vehicle, and having at least one second connecting device for producing a cableless electrical connection between the power grid connector and the motor vehicle. The first connecting device and the second connecting device are connected to the power grid connector via a common rectifier device.

7 Claims, 2 Drawing Sheets

(51) Int. Cl.
  *B60L 53/22*  (2019.01)
  *B60L 53/12*  (2019.01)
  *B60L 53/14*  (2019.01)
  *B60L 53/30*  (2019.01)
  *H02J 7/00*  (2006.01)
  *B60L 53/00*  (2019.01)

(56) References Cited

U.S. PATENT DOCUMENTS

| | | | |
|---|---|---|---|
| 2011/0298422 A1* | 12/2011 | Failing | H02J 50/70 320/109 |
| 2014/0084679 A1* | 3/2014 | Li | B60L 50/90 307/10.1 |
| 2014/0132212 A1* | 5/2014 | Ichikawa | B60L 7/14 320/108 |
| 2014/0253027 A1* | 9/2014 | Obayashi | B60L 53/22 320/108 |
| 2015/0270719 A1* | 9/2015 | Kurs | H02J 50/40 320/108 |
| 2017/0305280 A1* | 10/2017 | Weidner | B60L 53/122 |
| 2018/0037121 A1* | 2/2018 | Narla | B60L 53/00 |
| 2018/0065489 A1* | 3/2018 | Zhou | B60L 3/003 |
| 2018/0099574 A1* | 4/2018 | Zhou | H02M 7/537 |
| 2018/0102706 A1* | 4/2018 | Gao | H02M 3/02 |
| 2018/0201147 A1* | 7/2018 | Shin | B60L 53/11 |
| 2018/0366970 A1* | 12/2018 | Zhou | H02J 7/0034 |
| 2019/0084444 A1* | 3/2019 | Ge | B60L 50/15 |

FOREIGN PATENT DOCUMENTS

| | | |
|---|---|---|
| DE | 10 2011 017 369 A1 | 10/2012 |
| DE | 102011089989 A1 | 6/2013 |
| DE | 102012218738 A1 | 4/2014 |
| DE | 112012005145 T5 | 10/2014 |
| DE | 10 2013 220 548 A1 | 4/2015 |
| DE | 102016102053 A1 | 8/2017 |
| EP | 2572431 A2 | 3/2013 |
| EP | 2 657 063 A1 | 10/2013 |
| EP | 2 777 129 | 9/2014 |
| EP | 2 782 063 A1 | 9/2014 |
| EP | 2 983 267 A1 | 2/2016 |
| FR | 2985868 A1 | 7/2013 |
| JP | 2013-240206 A | 11/2013 |
| WO | 2011/145939 A2 | 11/2011 |
| WO | 2013/104409 A1 | 7/2013 |

OTHER PUBLICATIONS

The extended European search report dated Jun. 4, 2019, in corresponding European patent application No. 18181073.0 including partial machine-generated English translation; 19 pages.

European Search Report dated Feb. 21, 2019, in connection with corresponding EP Application No. 18181073.0 (22 pgs., including machine-generated English translation).

Examination Report dated Jul. 27, 2020 in corresponding European Application No. 18 181 073.0; 11 pages including partial machine-generated English-language translation.

* cited by examiner

ENERGY SUPPLY DEVICE TO SUPPLY ELECTRICAL ENERGY FOR AT LEAST ONE TERMINAL DEVICE AND METHOD FOR OPERATING AN ENERGY SUPPLY DEVICE

FIELD

The invention relates to an energy supply device to supply electrical energy for a motor vehicle, having a power grid connector for connection of the energy supply device to an alternating current power grid, having at least one first connecting device for producing a cabled electrical connection between the power grid connector and the motor vehicle, and having at least one second connecting device for producing a cableless electrical connection between the power grid connector and the motor vehicle. The invention further relates to a method for operating an energy supply device.

BACKGROUND

The energy supply device serves to supply electrical energy for the motor vehicle. For this purpose, the energy supply device is connected to or at least can be connected to the alternating current power grid, preferably a public alternating current power grid, by way of its power grid connector. The energy supply device can take electrical energy from the alternating current power grid via the power grid connector and make it available to the motor vehicle or transmit it to the motor vehicle.

The energy transmitted to the motor vehicle is used, for example, for charging an energy storage unit of the motor vehicle, preferably a traction battery of the motor vehicle. The traction battery is understood to mean an energy storage unit that is employed for operating a traction drive of the motor vehicle, that is, an electric machine, by means of which the electrical energy that has been intermediately stored in the traction battery can be converted to mechanical energy that is directed at driving the motor vehicle.

The energy supply device can transmit the electrical energy supplied via the power grid connector in a cable connection, on the one hand, and in a cableless connection, on the other hand, to the motor vehicle. For this purpose, the energy supply device can be employed optionally for producing the cabled electrical connection and/or the cableless electrical connection. For producing the cabled electrical connection, the energy supply device is equipped with the first connecting device and, for producing the cableless electrical connection, with the second connecting device. Both the first connecting device and the second connecting device are each designed correspondingly for producing the respective electrical connection.

Known from the prior art is, for example, the publication DE 10 2010 022 727 A1. This publication relates to a charging system for charging the traction battery of an electrically driven motor vehicle, said charging system comprising a first rectifier, which, at the input end, can be galvanically connected to an alternating voltage power supply grid or three-phase alternating current power supply grid and which, at the output end, is connected, by way of an intermediate circuit provided for stabilizing the direct voltage produced, to the input of a charging regulation circuit, which is connected at the output end to a traction battery. In this case, it is provided that the intermediate circuit is connected to the output of a second rectifier, which, at the input end, is connected to an electrical winding on the vehicle side, by way of which the electrical energy can be inductively transmitted to the motor vehicle from a charging station that is connected to an alternating voltage power supply grid or a three-phase alternating current power supply grid, the charging station having a coupling device that can be attached to the motor vehicle and comprises a stationary winding.

SUMMARY

The object of the invention is to propose an energy supply device to supply electrical energy for a motor vehicle that, in comparison to known energy supply devices has advantages and, in particular, at the same time, can be utilized extremely flexibly in the packing space.

This is achieved in accordance with the invention by an energy supply device. It is provided thereby that the first connecting device and the second connecting device are connected to the power grid connector by way of a common rectifier device.

Via the power grid connector, alternating current is supplied to the energy supply device from the alternating current power grid. However, the first connecting device and the second connecting device need direct current in order to provide electrical energy to the motor vehicle. For this reason, the rectifier device is provided, by way of which the two connecting devices, that is, both the first connecting device and the second connecting device, are connected to the power grid connector of the energy supply device. The rectifier device serves for converting alternating current to direct current, with the latter being provided to the first connecting device and the second connecting device.

The electrical energy can then be supplied to the motor vehicle by means of the first connecting device, the second connecting device, or both at the same time. It can thus be provided that the electrical energy is supplied for the motor vehicle solely by means of the first connecting device or solely by means of the second connecting device. However, it can also be provided that electrical energy is supplied to the motor vehicle by means of both the first connecting device and the second connecting device, that is, in parallel. It can likewise be provided that electrical energy is provided by means of the first connecting device to the motor vehicle and by means of the second connecting device to another motor vehicle.

In any case, however a supply of direct current to the first connecting device and to the second connecting device occurs by means of the common rectifier device, in particular exclusively by means of the common rectifier device. Due to the use of the common rectifier device for the first connecting device and the second connecting device, it is possible to achieve a space-saving design of the energy supply device and, at the same time, a high flexibility in utilization of the energy supply device, because electrical energy can be provided to the motor vehicle or motor vehicles in both a cabled connection and in a cableless connection.

The rectifier device can be unidirectional or bidirectional in design. In the first case, it is possible by means of the rectifier device to take electrical energy from the alternating current power grid and supply it to the connecting devices. The opposite direction is not provided for. If, in contrast, the bidirectional design of the rectifier device is provided, then the rectifier device can serve both for taking electrical energy from the alternating current power grid and providing it to the connecting devices and also for energy transmission in the opposite direction. This means that, for example, energy is transmitted from the motor vehicle by means of the first connecting device and/or the second connecting device to the energy supply device and from the latter, via the rectifier device, to the alternating current power grid.

Based on the integration of the first connecting device and the second connecting device in the energy supply device, it can additionally be provided that, by means of one of the connecting devices, electrical energy is to be taken from the motor vehicle and, by means of the respective other one of the connecting devices, supplied to the other motor vehicle. In this respect, it is possible to realize or at least to implement an extremely flexible operation of the energy supply device.

Another preferred embodiment of the invention provides that the rectifier device has exactly one rectifier, which, on the one hand, is connected to the power grid connector and, on the other hand, is electrically linked in parallel to the first connecting device and the second connecting device. The rectifier serves for rectification of the alternating current taken from the alternating current power grid to direct current, which, subsequently, is provided to the first connecting device and the second connecting device. For this purpose, the rectifier is connected at the input end to the power grid connector and at the output end in parallel to the first connecting device and to the second connecting device.

The electrical power supplied in total to the first connecting device and to the second connecting device is therefore conveyed via the rectifier. Preferably, in this respect, the energy supply device is adapted correspondingly. For example, the rectifier is designed in such a way that it can supply both the first connecting device and the second connecting device with an electrical power that corresponds to the sum total of the nominal powers of the two connecting devices.

If this is not the case, that is, if the nominal power of the rectifier is less than the sum total of the nominal powers of the two connecting devices, then the energy supply device is preferably designed in such a way that, in each case, either only one of the two connecting devices can be operated or else that the actual power of at least one of the two connecting devices is adjusted in such a way that it is less than the respective nominal power.

In the first case, therefore, the second connecting device is rendered inoperative when, for example, electrical energy is supplied to the motor vehicle by means of the first connecting device. Conversely, the first connecting device is rendered inoperative when electrical energy is supplied to the motor vehicle by means of the second connecting device. Instead of rendering said devices inoperative, it is also possible to provide for a reduction in the actual power of the corresponding connecting device in each case, namely, preferably in such a way that the sum total of the actual powers of the two connecting devices corresponds to the nominal power of the rectifier or the rectifier device.

In the scope of another embodiment of the invention, it can be provided that the rectifier device has a first rectifier and a second rectifier, which, on the one hand, are electrically connected in parallel to the power grid connector, wherein, on the one hand, the first rectifier is electrically linked to the first connecting device and, on the other hand, the second rectifier is electrically linked to the second connecting device. In contrast to the previously described design, therefore, instead of the one rectifier, a plurality of rectifiers, namely, the first rectifier and the second rectifier, are provided. The two rectifiers are electrically connected, on the one hand, that is, at the input end, in parallel to the power grid connector. On the other hand, that is, at the output end, the first rectifier is electrically connected at least to the first connecting device and the second rectifier is electrically connected at least to the second connecting device.

Preferably, the two rectifiers are designed in such a way that they make possible an operation of the respective connecting device at its nominal power. In this regard, the nominal power of the first rectifier preferably corresponds to the nominal power of the first connecting device and the nominal power of the second rectifier preferably corresponds to the nominal power of the second connecting device. Obviously, however, it can be provided in this case that the actual power of at least one of the connecting devices or of both connecting devices is reduced, if this is necessary—for example, if the power that can be supplied by the alternating current power grid or the power that can be taken via the power grid connector from the alternating current power grid is not sufficient to operate each of the two connecting devices with their nominal power.

In an especially preferred embodiment, it is provided that the rectifier device has a switching device, by means of which the two rectifiers can be coupled to each other at the output end. In a first switch position of the switching device, therefore, the first rectifier is connected to the first connecting device and electrically separated from the second connecting device, whereas the second rectifier is connected to the second connecting device and electrically separated from the first connecting device. In a second switch position of the switching device, in contrast, the first rectifier and the second rectifier are each electrically connected both to the first connecting device and to the second connecting device.

Another preferred embodiment of the invention provides that, in a first kind of operation of the energy supply device, the first rectifier is electrically connected to the first connecting device and is separated from the second connecting device and the second rectifier is electrically connected to the second connecting device and is separated from the first connecting device, wherein, in a second kind of operation of the energy supply device, the first rectifier and the second rectifier are electrically connected in parallel and are each connected to the first connecting device and to the second connecting device. Reference to this has already been made. The two kinds of operation can be provided, for example, by means of the mentioned switching device, wherein, in the first kind of operation, the first switch position and, in the second kind of operation, the second switch position are set at the switching device.

An enhancement of the invention provides that the first connecting device has a terminal for connection of a power cable provided for producing the cabled connection to the motor vehicle and/or has the power cable connected to the terminal. The cabled connection to the motor vehicle can be produced or is produced via the first connecting device. For this purpose, at least the terminal for connection of the power cable, by way of which the electrical connection to the motor vehicle ultimately is present, is assigned to the energy supply device. The terminal is, for example, a plug-in connection, which provides a plug connection, by way of which the power cable can be electrically connected to the first rectifier.

Obviously, it is additionally possible for the power cable to be a component of the first connecting device. It can likewise be provided that the power cable is electrically connected permanently and undetachably, that is, at least not detachably without destruction, to the first rectifier. In this case, for example, only the power cable is present, and not the terminal or plug-in connection. The plug-in connection is arranged, for example, on a housing of the energy supply device in such a way that the plug connection to the power cable can be produced in a simple way. This makes possible an extremely flexible utilization of the energy supply device.

Another preferred embodiment of the invention provides that the second connecting device has an inverter and a wireless charging device that is electrically connected to the rectifier device via the inverter. The inverter serves for converting the direct current supplied by the rectifier device to an alternating current. The alternating current is supplied, in turn, to the wireless charging device. The wireless charging device is present, for example, in the form of a coil or a plurality of coils.

By means of the energy supply device, therefore, the alternating current taken from the alternating current power grid for cableless supply of the electrical energy for the motor vehicle is first converted to direct current by means of the rectifier device. Subsequently, this direct current is again converted to alternating current, namely, by means of the inverter. The frequency of the alternating current is thereby transformed to meet the requirements of the wireless charging device. In particular, the frequency of the alternating current supplied by means of the inverter is markedly higher than the frequency of the alternating current taken from the alternating current power grid via the power grid connector. In this respect, it is possible in an advantageous manner to achieve a flexible operation of the energy supply device.

Another preferred embodiment of the invention provides that the rectifier device and the terminal of the first connecting device are arranged in a common housing of the energy supply device. The common housing is prepared, for example, for mounting on a wall, but it can also be arranged at another suitable place. Due to the arrangement of the (common) rectifier device and of the terminal in the housing, an especially compact embodiment of the energy supply device is realized.

Another embodiment of the invention provides that the inverter is arranged in the housing and is electrically connected to the wireless charging device via an electrical connection extending outside of the housing, at least in part. The inverter and the wireless charging device are therefore arranged separately from each other; namely, the inverter is in the housing and the wireless charging device is outside of the housing. With the arrangement of the inverter in the housing and, in particular, in addition to the rectifier device and the terminal of the first connecting device, an especially high degree of integration of the energy supply device is made possible, wherein only a small part thereof, namely, the wireless charging device, is present outside of the housing. The energy supply device can therefore also be used in tight spatial situations.

Finally, it is possible in the scope of another preferred embodiment of the invention to provide that the inverter and the wireless charging device are designed as a joint construction unit that is arranged outside of the housing, wherein the inverter is electrically connected to the rectifier device via an electrical connection extending outside of the housing, at least in part. In contrast to the previously described embodiment, in which the inverter is arranged in the housing, it is not intended that both the inverter and the wireless device are present outside of the housing. The common construction unit is thereby formed.

The inverter is then electrically connected by way of the electrical connection to the rectifier device arranged in the housing. This has the advantage that the inverter and the wireless charging device can be replaced together independently of other elements of the energy supply device. Such a replacement may be necessary, for example, when the motor vehicle is exchanged for another motor vehicle that requires a different wireless charging device and/or a different inverter, such as, for example, an inverter with a different frequency, than the former motor vehicle. The electrical connection, which is made via the inverter to the rectifier device or is linked to the latter, extends, at least in part and preferably in full, outside of the housing.

The invention further relates to a method for operating an energy supply device to supply electrical energy for a motor vehicle, in particular for operating an energy supply device in accordance with the preceding statements, wherein the energy supply device is equipped with a power grid connector for connection of the energy supply device to an alternating current power grid, with at least one first connecting device for producing a cabled electrical connection between the power grid connector and the motor vehicle, and with at least one second connecting device for producing a cableless electrical connection between the power grid connector and the motor vehicle. In this case, it is provided that the first connecting device and the second connecting device are connected to the power grid connector via a common rectifier device.

Reference has already been made to the advantages of such an embodiment of the energy supply device or to such a procedure. Both the energy supply device and the method for the operation thereof can be further developed in accordance with the preceding statements, so that, in this regard, reference is made to said statements.

In accordance with the invention, it is provided, for example, that a suitable kind of operation is to be chosen from the kinds of operation mentioned above, that is, the first kind of operation and the second kind of operation, and set at the rectifier device. For this purpose, it is provided, in particular, that the switching device, which has also already been mentioned, is to be set correspondingly. This makes possible an especially flexible operation of the energy supply device.

BRIEF DESCRIPTION OF THE DRAWINGS

The invention will be explained in detail below on the basis of the exemplary embodiments illustrated in the drawing, without any limitation of the invention thereby occurring. Shown are.

DETAILED DESCRIPTION

Figure 1:
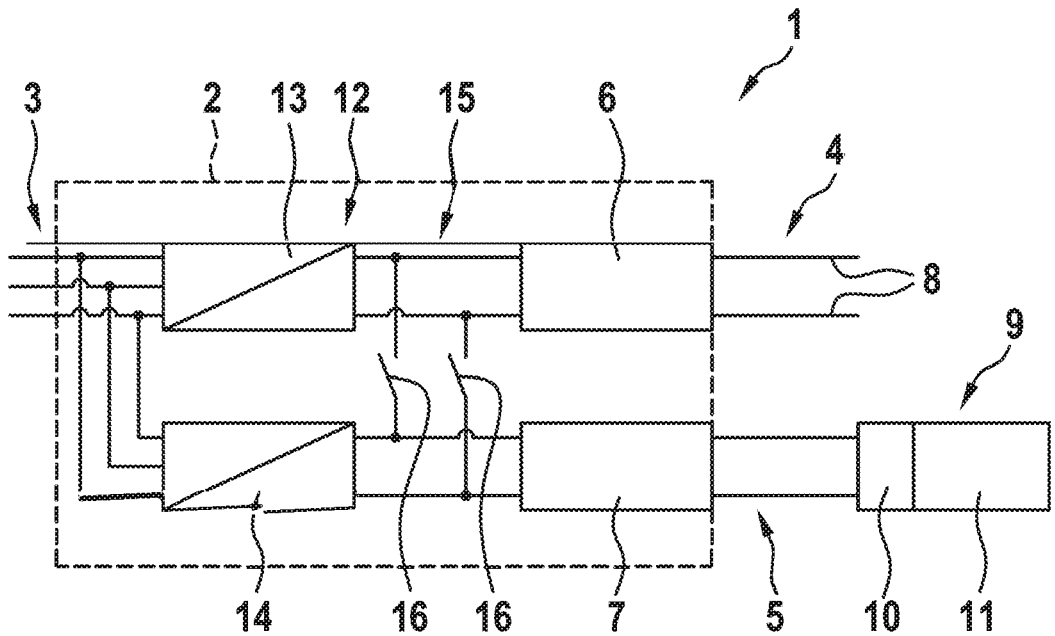
FIG. 1 a schematic illustration of an energy supply device in a first embodiment.

FIG. 1 shows a schematic illustration of an energy supply device 1, which is provided and designed to supply electrical energy for a motor vehicle, which is not illustrated in further detail. The energy supply device 1 is equipped with a housing 2, in which essential components are arranged. Furthermore, the energy supply device 1 has a power grid connector 3 for connection of the energy supply device 1 to an alternating current power grid, preferably a public alternating current power grid. In the exemplary embodiment illustrated here, the power grid connector 3 is three-phase in design.

Furthermore, the energy supply device 1 is equipped with a first connecting device 4 and a second connecting device 5. The first connecting device 4 is provided and designed for producing a cabled electrical connection between the power grid connector 3 and the motor vehicle, whereas the second connecting device 5 is provided and designed for producing a cableless electrical connection between the power grid connector 3 and the motor vehicle. The first connecting device 4 has a first terminal 6 and the second connecting device 5 has a second terminal 7. The first terminal 6 and—optionally—also the second terminal 7 are preferably each designed as a plug-in connection.

A power cable 8, by way of which, ultimately, the electrical connection to the motor vehicle can be produced, can be connected to the terminal 6. The second connecting device 5 has a construction unit that is connected to the second terminal 7 and in which an inverter 10 and a wireless charging device 11 are present. The wireless charging device 11 is designed, for example, as a coil and is connected via the inverter 10 to the second terminal 7.

The first connecting device 4 and the second connecting device 5 are connected to the power grid connector 3 by way of a common rectifier device 12. In the exemplary embodiment illustrated here, the rectifier device 12 is equipped with a first rectifier 13 and a second rectifier 14. The two rectifiers 13 and 14 are connected, on the one hand, to the power grid connector 3. On the other hand, the first rectifier 13 is connected at least to the first connecting device 4 and the second rectifier 14 is connected at least to the second connecting device 5, or each of them are connected to the corresponding terminal 6 or 7.

In addition, a switching device 15 can be present, which has at least one switch 16—in the exemplary embodiment illustrated here, two switches 16. By means of the switching device 15, the rectifiers 13 and 14 can be electrically connected to each other at the output end. This means that the rectifiers 13 and 14 are each connected to both connecting devices 4 and 5 or to the corresponding terminals 6 and 7.

It is thereby provided that, in a first switch position of the switching device 15, the first rectifier 13 is connected to the first connecting device 4 and is electrically separated from the second connecting device 5. In addition, the second rectifier 14 is electrically connected to the second connecting device 5 and is electrically separated from the first connecting device 4. In a second switch position of the switching device 15, in contrast, the two rectifiers 13 and 14 are coupled to each other at the output end and, accordingly, are each electrically connected both to the first connecting device 4 and to the second connecting device 5.

Figure 2:
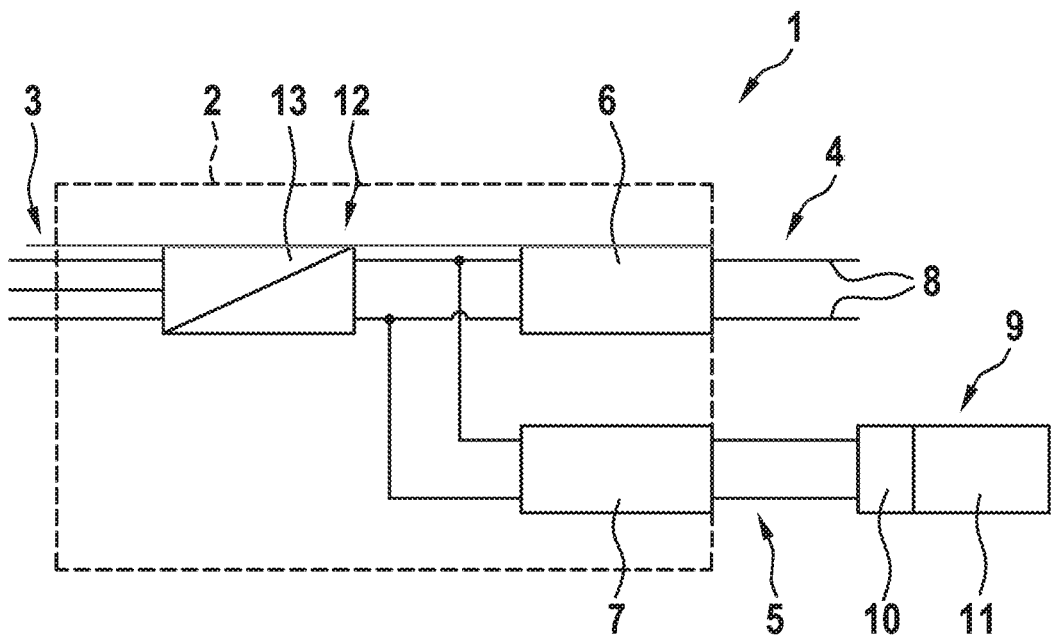
FIG. 2 a schematic illustration of the energy supply device in a second embodiment.

FIG. 2 shows the energy supply device 1 in a second embodiment. This embodiment is fundamentally similar in design to the first embodiment, so that reference is made to the preceding statements and only differences will be addressed below. Said differences lie in the fact that the rectifier device 12 has only the rectifier 13, but not the second rectifier 14. Also, the switching device 15 with the switches 16 is dispensed with. Instead, the connecting devices 4 and 5 or the terminals 6 and 7 are always connected in parallel to the rectifier device 12 or the rectifier 13.

Figure 3:
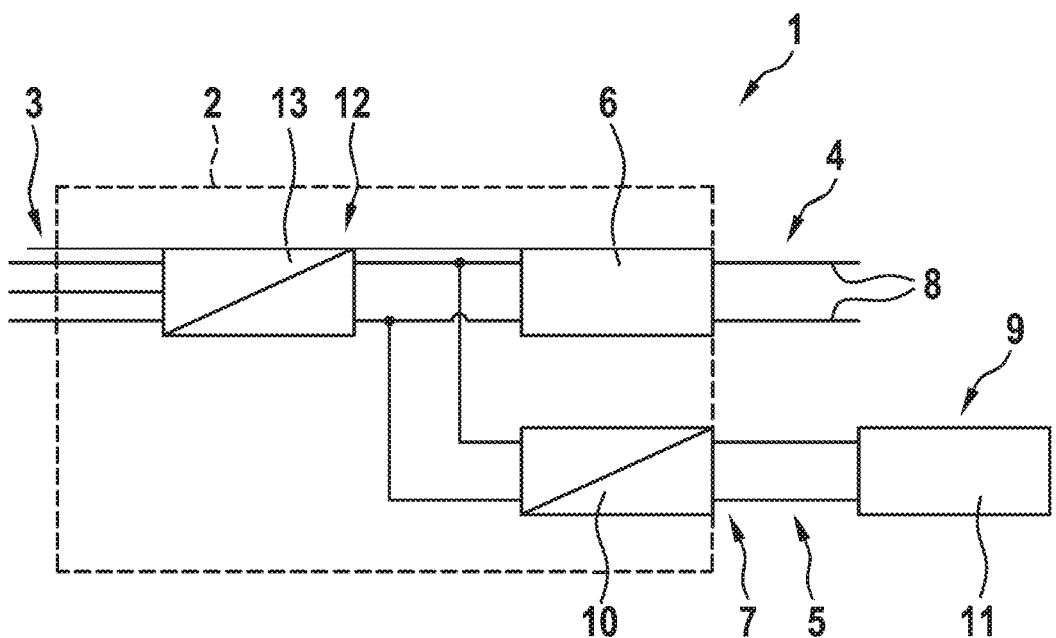
FIG. 3 a schematic illustration of the energy supply device in a third embodiment.

FIG. 3 shows a third embodiment of the energy supply device 1. This embodiment is essentially similar in design to the second embodiment, so that reference is made to the preceding statements and only differences will be addressed below. Said differences lie in the fact that the inverter 10 is also now arranged in the housing 2, while the wireless charging device 11 still remains outside of the housing 2. For example, the wireless charging device 11 is electrically connected or at least can be electrically connected to the inverter 10 via the second terminal 7.

The described embodiments of the energy supply device 1 have the advantage that a high degree of integration of the energy supply device 1 is achieved, in that the connecting devices 4 and 5 are supplied with electric current via the common rectifier device 12. In addition, the essential components of the energy supply device 1 are arranged in the common housing 2.

The invention claimed is:

1. An energy supply device to supply electrical energy for a motor vehicle, comprising:
   a power grid connector for connection of the energy supply device to an alternating current power grid, having at least one first connecting device for producing a cabled electrical connection between the power grid connector and the motor vehicle, and having at least one second connecting device for producing a cableless electrical connection between the power grid connector and the motor vehicle,
   wherein the first connecting device and the second connecting device are connected to the power grid connector by way of a rectifier device,
   wherein the rectifier device has a first rectifier and a second rectifier, which, on the one hand, are electrically connected in parallel to the power grid connector,
   wherein the first rectifier is electrically linked, on the other hand, to the first connecting device, and the second rectifier is electrically linked, on the other hand, to the second connecting device,
   wherein, in a first kind of operation of the energy supply device, the first rectifier is electrically connected to the first connecting device and is separated from the second connecting device, and the second rectifier is electrically connected to the second connecting device and is separated from the first connecting device,
   wherein, in a second kind of operation of the energy supply device, the first rectifier and the second rectifier are electrically connected in parallel and are each electrically connected to the first connecting device and the second connecting device,
   wherein the energy supply device further comprises at least one switch at output ends of the first rectifier and the second rectifier, and in the second kind of operation, the first rectifier and the second rectifier are electrically connected to each other at the output ends of the first rectifier and the second rectifier via the at least one switch, and
   wherein the at least one switch is off-state in the first kind of operation, and the at least one switch is on-state in the second kind of operation.

2. The energy supply device according to claim 1, wherein the first connecting device has a terminal for the connection of a power cable provided for producing the cabled connection to the motor vehicle, and/or has the power cable connected to the terminal.

3. The energy supply device according to claim 1, wherein the second connecting device has an inverter and a wireless charging device that is electrically connected to the rectifier device via the inverter.

4. The energy supply device according to claim 3, wherein the rectifier device and the terminal of the first connecting device are arranged in a common housing of the energy supply device.

5. The energy supply device according to claim 4, wherein the inverter is arranged in the housing and is electrically connected to the wireless charging device by way of an electrical connection that extends outside of the housing, at least in part.

6. The energy supply device according to claim 4, wherein the inverter and the wireless charging device are designed as a common construction unit arranged outside of the housing, wherein the inverter is electrically connected to the rectifier device by way of an electrical connection that extends outside of the housing, at least in part.

7. A method for operating an energy supply device to supply electrical energy for a motor vehicle, in particular for operating an energy supply device comprising:

equipping the energy supply device with a power grid connector for connection of the energy supply device to an alternating current power grid, with at least one first connecting device for producing a cabled electrical connection between the power grid connector and the motor vehicle, and with at least one second connecting device for producing a cableless electrical connection between the power grid connector and the motor vehicle, wherein the first connecting device and the second connecting device are connected to the power grid connector via a rectifier device, wherein the rectifier device has a first rectifier and a second rectifier, which, on the one hand, are electrically connected in parallel to the power grid connector, wherein the first rectifier is electrically linked, on the other hand, to the first connecting device, and the second rectifier is electrically linked, on the other hand, to the second connecting device, wherein, in a first kind of operation of the energy supply device, the first rectifier is electrically connected to the first connecting device and is separated from the second connecting device, and the second rectifier is electrically connected to the second connecting device and is separated from the first connecting device, wherein, in a second kind of operation of the energy supply device, the first rectifier and the second rectifier are electrically connected in parallel and are each electrically connected to the first connecting device and the second connecting device, and wherein the energy supply device further comprises at least one switch at output ends of the first rectifier and the second rectifier, and in the second kind of operation, the first rectifier and the second rectifier are electrically connected to each other at the output ends of the first rectifier and the second rectifier via the at least one switch, and wherein the at least one switch is off-state in the first kind of operation, and the at least one switch is on-state in the second kind of operation.

\* \* \* \* \*